March 24, 1959 J. A. BAGLEY 2,879,342

TELEPHONE RECEIVER SUPPORT

Filed May 15, 1957

INVENTOR.
JANCY A. BAGLEY
BY
Donnelly, Mentag & Harrington
ATTORNEYS

United States Patent Office 2,879,342
Patented Mar. 24, 1959

2,879,342

TELEPHONE RECEIVER SUPPORT

Jancy A. Bagley, Detroit, Mich.

Application May 15, 1957, Serial No. 659,305

4 Claims. (Cl. 179—146)

Figure 1:
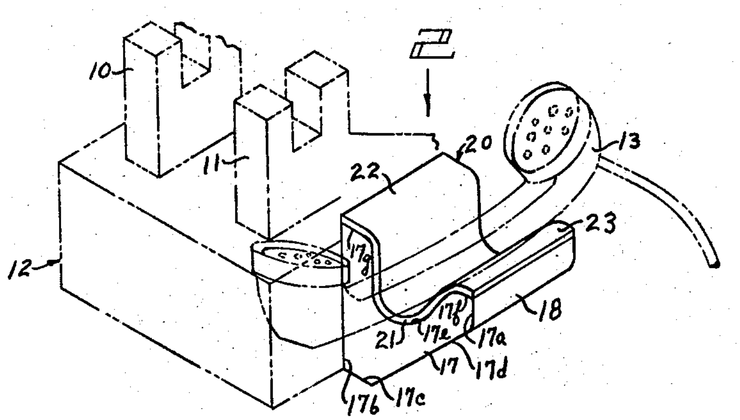

This invention relates to a novel and improved telephone receiver support, and, more particularly, to an auxiliary telephone receiver support adapted for use with the present day type telephones which include a single ear and mouth piece member called a handset or receiver.

Most of the telephones in use at the present time are of the type which have a single ear and mouth piece called a handset or receiver which is adapted to be nested or positioned when the telephone is not in use in a main cradle or support formed on the telephone. When telephones of this type are in use and it is desired to "hold the phone" for some reason, as for example, to go to a filing cabinet to get some papers or other materials, it is necessary to lay the receiver down and sometimes it is inconvenient to do so because of the lack of a suitable place for the receiver. Accordingly, it is the primary object of this invention to provide an auxiliary support or cradle on which a telephone receiver may be disposed quickly and conveniently so as to maintain the talking circuit closed and to permit the operator of the phone to accomplish such disposition of the receiver in an efficient manner.

It is another object of the invention to provide an auxiliary telephone receiver support which may be easily and quickly attached to the present day type telephone, whereby it will be disposed in a convenient location adjacent the telephone.

It is a further object of the invention to provide an auxiliary telephone receiver support which will be simple, compact and lightweight in construction, economical of manufacture and efficient in operation.

It is a still further object of the present invention to provide an auxiliary telephone receiver support which may be formed as a unitary structure from a suitable plastic material, and which may be easily and quickly attached to or detached from a present day type telephone.

Other objects, features and advantages of this invention will be apparent from the following detailed description and appended claims, reference being had to the accompanying drawing forming a part of the specification wherein like reference numerals designate corresponding parts of the several views.

Figure 2:
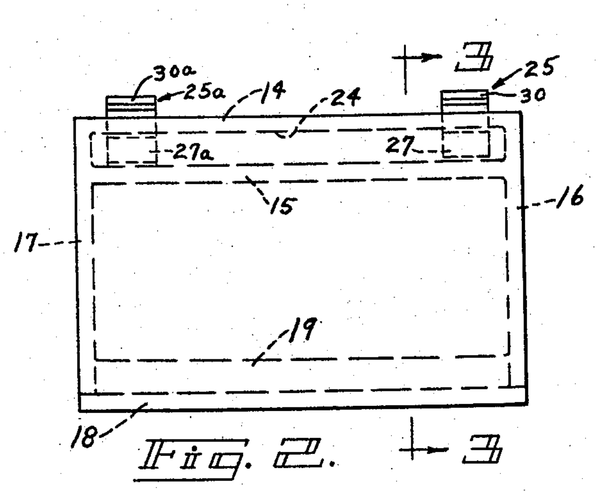
Figure 3:
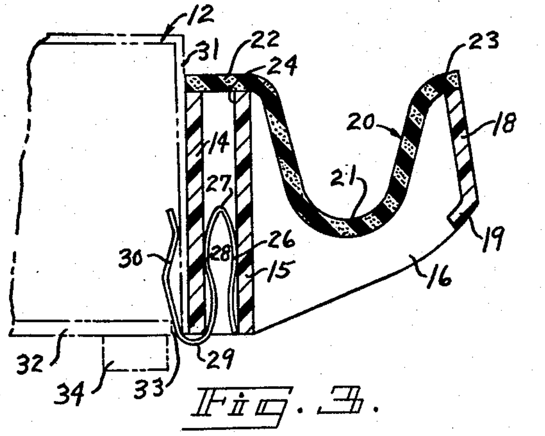

In the drawings:

Fig. 1 is a partial perspective view of a cradle type telephone to which is attached a telephone receiver support made in accordance with the principles of the invention;

Fig. 2 is a top plan view of the telephone receiver support illustrated in Fig. 1, taken in the direction of the arrow marked "2"; and Fig. 3 is an elevational sectional view of the telephone receiver support illustrated in Fig. 2, taken along the line 3—3 thereof, looking in the direction of the arrows, and showing a fragmentary portion of a cradle type telephone and the clip structure employed for attaching the receiver support to the telephone.

Referring now to the drawings and, in particular, to Fig. 1, the numerals 10 and 11 designate the main cradle or telephone receiver support members of a present day telephone which further includes the usual base designated by the numeral 12. Detchably mounted on the side of the telephone base 12 is a telephone receiver support made in accordance with the principles of the invention, and on which is operatively disposed a telephone handset or receiver 13.

As shown in Figs. 2 and 3, the illustrative embodiment of the invention comprises the vertical longitudinal side wall 14 which is adapted to be disposed against the base of the telephone on which the support is to be mounted. The receiver support of the present invention further includes the inner longitudinally extended vertical partition wall 15 which is spaced inwardly from the wall 14 and is disposed parallel thereto. As best seen in Fig. 2, the telephone receiver support further includes the vertical end walls 16 and 17 which are disposed parallel to each other and which are integral with the side wall 14 and the partition wall 15. As shown in Fig. 1, the end wall 17 is formed with a vertical side edge **17*a* which terminates at its lower end with the downwardly and inwardly sloping edge 17*d*. The sloping edge 17*d* comprises part of the lower edge of the end wall 17 and it terminates at the horizontal lower edge 17*c*. The side edge 17*a* is substantially vertical and the opposite side edge 17*b* is also vertical but is substantially longer than the side edge 17*a* and extends for the full height of the support. The upper edge of the end wall 17 includes the central U-shaped or concave shaped portion 17*e* which terminates on the inner side thereof in the substantially horizontal edge 17*g* and on the outer side thereof with the substantially horizontal edge 17*f*. The opposite end wall 16 is formed identically to the side wall 17**.

The side wall 18 may be termed the outer side wall and is integral with the end walls 16 and 17 and is disposed in a substantially vertical plane. The upper end of the outer side wall 18 extends downwardly from a point substantially parallel with the upper edge of the inner side wall 14 and to a point substantially half the height of the wall 14. The outer side wall 18 terminates in a short inwardly and downwardly extended wall 19 which is integral therewith and with the end walls 16 and 17. It will be seen that the aforegoing construction provides a hollow support body which is open at the top and at the bottom thereof. The aforedescribed support body is preferably formed from a molded plastic although it will be understood that other suitable materials may be used.

The upper side of the telephone receiver support body is covered with a sheet of foam rubber or any other suitable flexible resilient material, generally designated by the numeral 20, and which is bonded thereto by any suitable adhesive. The foam rubber covering 20 includes the central U-shaped or concave longitudinally extended portion 21 and the inner horizontal end portion 22 and the outer substantially horizontal portion 23.

The telephone receiver support body walls 14 and 15 coact to form the hollow chamber or compartment 24 therebetween which is open along the lower end thereof. As shown in Figs. 2 and 3, a pair of spring clips, as 25 and **25*a*, are adapted to be detachably mounted in the compartment 24** and these clips are adapted to detachably retain the support on a telephone base, as more fully described hereinafter.

As shown in Fig. 3, the spring clip 25 includes the first leg portion 26 which is integral with the inverted U-shaped portion 27 and the second leg portion 28. The clip portions 26, 27 and 28 are adapted to be inserted in the compartment 24 under tension, whereby they will tend to releasably grip the walls 13 and 14, respectively, and retain the clip in the compartment 24. The clip 25 further includes the U-shape portion 29 which is integral with the second leg portion 28 and which extends downwardly and around the lower end of the body wall 14. Integrally formed with the U-shaped portion 29 is the third clip leg portion 30 which extends upwardly and is adapted to spring toward the outer side of the wall 14.

The second clip 25*a* is formed identically with the clip 25, and the corresponding parts are marked with similar reference numerals followed by the small letter "*a*."

In use, the telephone receiver support of the present invention may be easily and quickly attached to a present day type telephone, as shown in Figs. 1 and 3. The aforementioned present day type telephone includes a side base wall, as 31, and a bottom base wall, as 32, which are normally separated from each other so as to provide the slot 33 therebetween. The numeral 34 designates the usual table engaging leg on telephones of the aforementioned type. In order to mount the telephone receiver support of the present invention on a telephone base 12, as shown in the drawings, the clip legs 30 are inserted through the slot 33 and the support is then moved upwardly to the position shown in Fig. 3, whereby the two spring clips 25 and 25*a* will securely retain the support in place on the telephone base side wall 31.

Experience has shown that a telephone receiver support as made in accordance with the illustrative embodiment is one which is very useful and convenient and time saving, in that a user may quickly dispose a telephone receiver as 13 thereon because of the proximity of the support to the telephone and because of the flexible resilient covering thereon. It will be understood that the telephone receiver 13 may be disposed on the support in the position as shown in Fig. 1, or it may be disposed thereon in a position reversed to that shown in Fig. 1. The novel longitudinal U-shaped upper surface of the support permits a user to dispose a telephone receiver therein without having to position the receiver in any exact location on the support.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. An auxiliary telephone receiver support, comprising: a body portion including a pair of spaced apart side walls and a pair of spaced apart end walls connected to said side walls; each of said end walls being formed with a concave recess along the upper edge thereof; a plurality of spring clips mounted on said body portion for attaching the support to a telephone; and, said support including a top surface covering fixedly mounted on the upper edges of said walls and covering the space between said walls so as to form a concave seat extending longitudinally of said support.

2. An auxiliary telephone receiver support comprising: a hollow body including a pair of side walls and end walls and being open at the top and bottom ends thereof; each of said end walls being formed with a U-shaped recess in the upper edge thereof; the upper side of said body portion being enclosed by a covering which is adapted to follow the contour of the upper edge of said end walls so as to form an upper surface on said body with a longitudinally extended U-shaped recess adapted for seating a telephone receiver; and, a plurality of spring clips on said body for attaching said support to a telephone.

3. An auxiliary telephone receiver support comprising: a hollow body including a pair of side walls and end walls and being open at the top and bottom ends thereof; each of said end walls being formed with a U-shaped recess along the upper edge thereof; the upper side of said bady portion being enclosed by a covering which is adapted to follow the contour of the upper edge of each of said end walls so as to form an upper surface on said body with a longitudinally extended U-shaped recess adapted for seating a telephone receiver; a partition wall formed in said body and being spaced inwardly from one of said side walls so as to form a compartment therebetween; and, a plurality of spring clips adapted to have a portion of each of said clips operatively mounted in said compartment and each of said clips being further adapted so as to have a portion thereof extended downwardly and around the adjacent end wall for engagement with a telephone for attaching the support thereto.

4. The telephone receiver support as defined in claim 3, wherein: said covering is formed from a flexible resilient material.

References Cited in the file of this patent

UNITED STATES PATENTS

| | | |
|---|---|---|
| D. 154,762 | Forkapa | Aug. 9, 1949 |
| 2,320,838 | Watson | June 1, 1943 |
| 2,551,141 | Langis et al. | May 1, 1951 |
| 2,608,622 | Von Gunten | Aug. 26, 1952 |
| 2,693,309 | Selbe | Nov. 2, 1954 |
| 2,705,264 | Gendron | Mar. 29, 1955 |
| 2,732,438 | Mansell et al. | Jan. 24, 1956 |